(12) United States Patent
Arai et al.

(10) Patent No.: US 11,387,719 B2
(45) Date of Patent: Jul. 12, 2022

(54) METHOD OF MANUFACTURING ROTARY ELECTRIC MACHINE

(71) Applicant: HITACHI AUTOMOTIVE SYSTEMS, LTD., Hitachinaka (JP)

(72) Inventors: Yuki Arai, Hitachinaka (JP); Motoo Kitahara, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 106 days.

(21) Appl. No.: 16/340,719

(22) PCT Filed: Oct. 24, 2017

(86) PCT No.: PCT/JP2017/038334
§ 371 (c)(1),
(2) Date: Apr. 10, 2019

(87) PCT Pub. No.: WO2018/092528
PCT Pub. Date: May 24, 2018

(65) Prior Publication Data
US 2019/0312493 A1    Oct. 10, 2019

(30) Foreign Application Priority Data

Nov. 18, 2016   (JP) .............................. JP2016-224634

(51) Int. Cl.
*H02K 15/00* (2006.01)
*B23K 31/02* (2006.01)
(Continued)

(52) U.S. Cl.
CPC ......... *H02K 15/0081* (2013.01); *B23K 31/02* (2013.01); *H02K 15/04* (2013.01); *B23K 2101/36* (2018.08)

(58) Field of Classification Search
CPC ........ H02K 3/34; H02K 3/50; H02K 15/0414; H02K 15/04; H02K 15/0081; B23K 2101/36; B23K 31/02
See application file for complete search history.

(56) References Cited

U.S. PATENT DOCUMENTS 6,278,206 B1 *   8/2001   Yockey .................... H02K 3/50
                                                              29/596
6,448,681 B1 *   9/2002   Matsunaga ........ H02K 15/0081
                                                              310/260
(Continued)

FOREIGN PATENT DOCUMENTS

CN       103378696 A      10/2013
CN       103947082 A       7/2014
(Continued)

OTHER PUBLICATIONS

Chinese Office Action dated Jul. 3, 2020 for the Chinese Patent Application No. 201780062856.3.
(Continued)

*Primary Examiner* — Jeffrey T Carley
(74) *Attorney, Agent, or Firm* — Volpe Koenig

(57) ABSTRACT

An object of the present invention is to suppress reduction of insulation reliability between stator coils. A method of manufacturing a rotary electric machine according to the present invention is a method of manufacturing a stator including an insulating member intervening between a plurality of coil end portions each protruding from a stator core, the method including: a first step of disposing an interposed member to cover part of the insulating member between the plurality of coil end portions; and a second step of welding part of each of the plurality of coil end portions.

6 Claims, 9 Drawing Sheets

(51) Int. Cl.
*H02K 15/04* (2006.01)
*B23K 101/36* (2006.01)

(56) References Cited

U.S. PATENT DOCUMENTS

| | | | | |
|---|---|---|---|---|
| 6,865,796 | B1* | 3/2005 | Oohashi | H02K 3/12 |
| | | | | 242/432 |
| 8,443,509 | B1* | 5/2013 | De Souza | H02K 15/0081 |
| | | | | 29/596 |
| 2003/0214190 | A1* | 11/2003 | Congdon | H02K 15/0081 |
| | | | | 310/71 |
| 2004/0020030 | A1* | 2/2004 | Yamamoto | H01F 5/04 |
| | | | | 29/605 |
| 2009/0096313 | A1* | 4/2009 | Harada | H02K 3/522 |
| | | | | 310/201 |
| 2010/0108666 | A1* | 5/2010 | Gafri | B23K 31/02 |
| | | | | 219/603 |
| 2012/0056500 | A1 | 3/2012 | Nakanishi et al. | |
| 2012/0274174 | A1* | 11/2012 | Uchida | H02K 3/38 |
| | | | | 310/254.1 |
| 2014/0225465 | A1 | 8/2014 | Goto | |
| 2015/0022045 | A1* | 1/2015 | Hagiwara | H02K 3/38 |
| | | | | 310/201 |
| 2015/0171693 | A1* | 6/2015 | Sakaue | H02K 3/28 |
| | | | | 310/215 |

FOREIGN PATENT DOCUMENTS

| | | | | |
|---|---|---|---|---|
| EP | 3082228 | A1 * | 10/2016 | ............ H02K 3/505 |
| JP | 2005-224028 | A | 8/2005 | |
| JP | 2011-217511 | A | 10/2011 | |
| JP | 2014-107876 | A | 6/2014 | |
| JP | 2015-104249 | A | 6/2015 | |
| WO | 2011/155059 | A1 | 12/2011 | |
| WO | WO-2013190677 | A1 * | 12/2013 | ............ H02K 5/225 |

OTHER PUBLICATIONS

Japanese Office Action dated Jan. 14, 2020 for the Japanese Patent Application No. 2018-551543.
International Search Report, PCT/JP2017/038334, dated Feb. 6, 2018, 1 pg.

* cited by examiner

METHOD OF MANUFACTURING ROTARY ELECTRIC MACHINE

TECHNICAL FIELD

The present invention relates to a method of manufacturing a rotary electric machine, and particularly to a method of manufacturing a rotary electric machine for driving a vehicle.

BACKGROUND ART

Along with rapid popularization of hybrid vehicles and electric vehicles, it has been demanded in recent years to devise various methods of manufacturing rotary electric machines.

PTL 1 discloses that with an inner-circumferential-side coil end portion 40a and an outer-circumferential-side coil end portion 40b covered above stator wiring 40, an annular insulating member 53 along the shape of a stator core 30 is disposed to protect the stator wiring 40 from damage due to heat such as sparks during welding.

However, there has been a possibility that an insulating member for insulation between stator coils is burnt and carbonized during welding.

CITATION LIST

Patent Literature

PTL 1: JP 2011-217511 A

SUMMARY OF INVENTION

Technical Problem

An object of the present invention is to suppress reduction of insulation reliability between stator coils.

Solution to Problem

A method of manufacturing a rotary electric machine according to the present invention is a method of manufacturing a stator including an insulating member intervening between a plurality of coil end portions each protruding from a stator core, the method including: a first step of disposing an interposed member to cover part of the insulating member between the plurality of coil end portions; and a second step of welding part of each of the plurality of coil end portions.

Furthermore, the method of manufacturing the rotary electric machine according to the present invention, in which the interposed member includes a material containing fiber.

Furthermore, the method of manufacturing the rotary electric machine according to the present invention, in which the interposed member includes a film material.

Furthermore, the method of manufacturing the rotary electric machine according to the present invention, in which the interposed member is disposed between the insulating member and a jig that positions the plurality of coil end portions.

Furthermore, the method of manufacturing the rotary electric machine according to the present invention, in which the interposed member is formed annularly along a disposed direction of the plurality of coil end portions, the interposed member having a plurality of through holes formed for inserting any of the plurality of coil end portions into the plurality of through holes.

Furthermore, the method of manufacturing the rotary electric machine according to the present invention, in which the interposed member is disposed at a substantial center in space between every adjacent coil end portions in a circumferential direction of the stator core.

Advantageous Effects of Invention

According to the present invention, there can be suppressed reduction of insulation reliability between stator coils.

DESCRIPTION OF EMBODIMENTS

Embodiment of a method of manufacturing a rotary electric machine according to the present invention will be described with reference to the drawings.

First Embodiment

Figure 1:
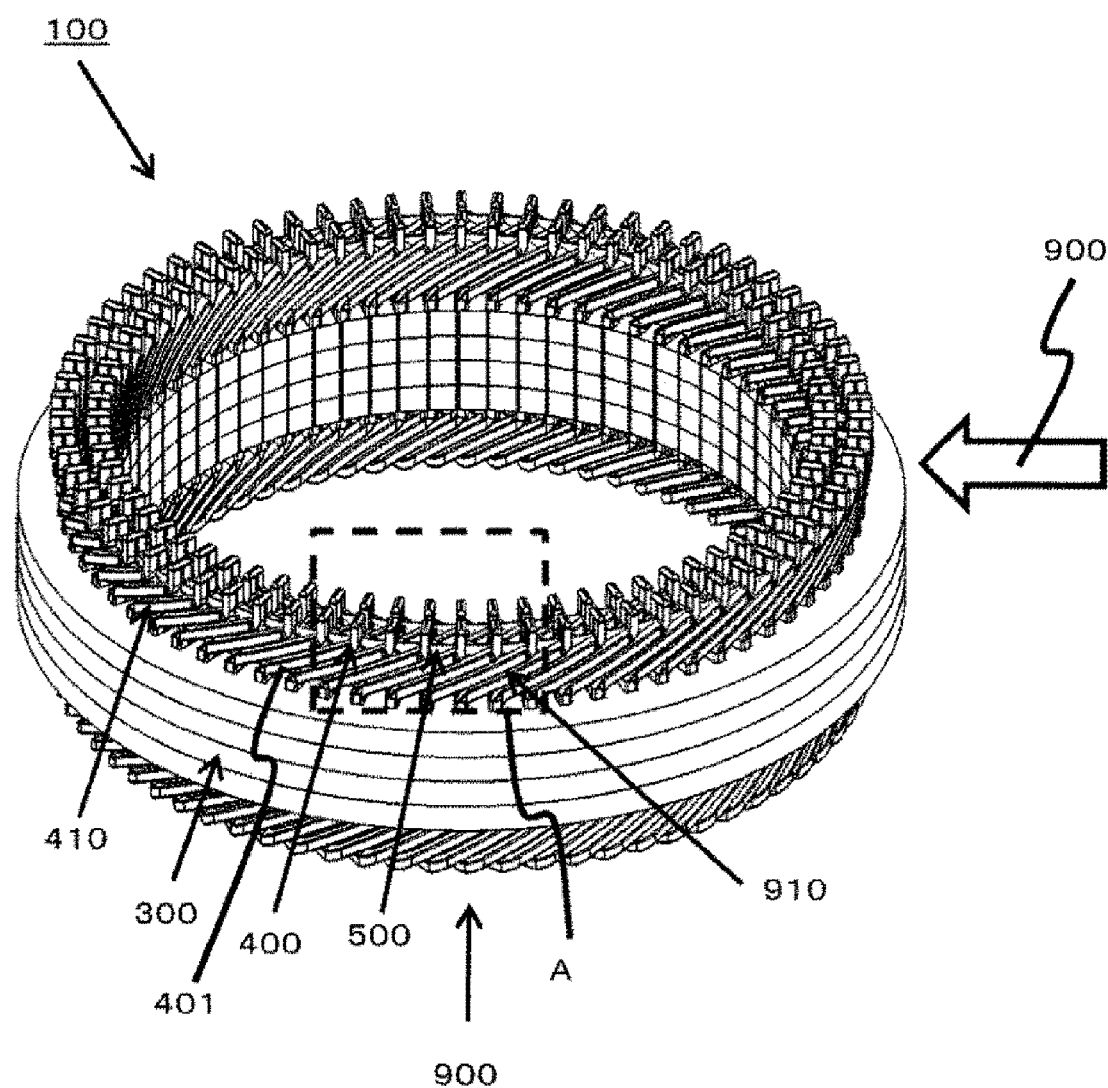
FIG. 1 is a perspective view of a stator 100 of a rotary electric machine according to the present embodiment.

FIG. 1 is a perspective view of a stator 100 of a rotary electric machine according to the present embodiment.

Each stator coil 410 is inserted into a stator core 300. Each coil end portion 400 is a portion of the stator coil 410 protruding outside the stator core 300, and is a portion above a portion 401 formed obliquely to the axial direction.

An insulating member 500 is disposed between each of the plurality of coil end portions 400 arrayed in the radial direction of the stator 100.

Figure 2:
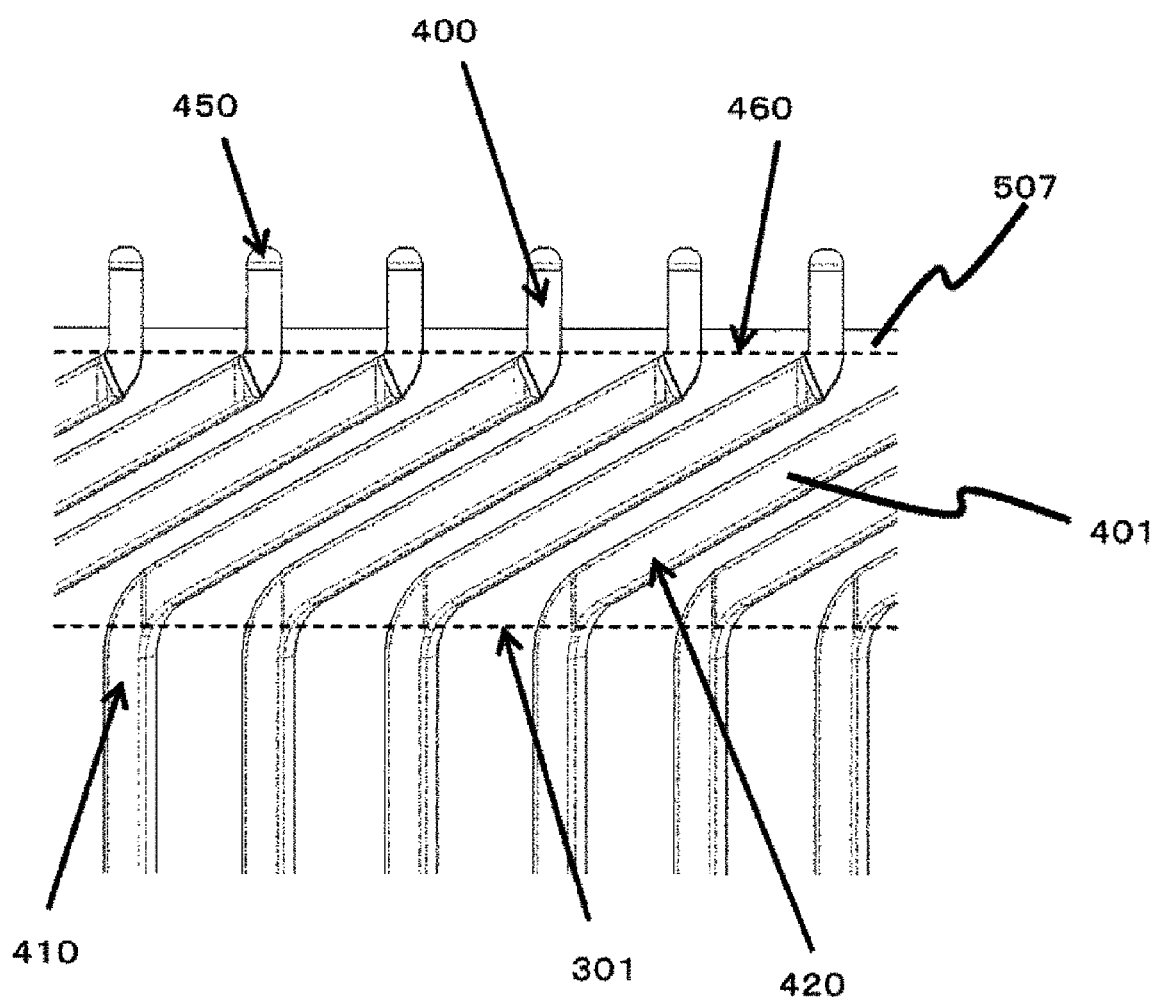
FIG. 2 is an enlarged view of a dotted rectangular portion A around coil end portions 400 illustrated in FIG. 1.

FIG. 2 is an enlarged view of a dotted rectangular portion A around the coil end portions 400 illustrated in FIG. 1. Among the two dotted-line portions, the lower dotted-line portion of the figure corresponds to an upper face portion 310 of the stator core 300.

The stator coil 410 mainly made of copper is a flat coil having a rectangular cross section. The stator coil 410 is coated with enamel 420 around a portion housed in the stator core 300, that is, the portion 401.

The enamel 420 is peeled off at the coil end portion 400 of the stator coil 410.

Part of the coil end portion 400, mainly the leading end of the coil end portion 400, is welded for energization and a welded portion 450 is provided.

The stator coil 410 is twisted and bent with the upper face portion 301 of the stator core 300 as a fulcrum.

Since the insulating member 500 is to be used to insulate the enamel 420 of each adjacent stator coil 410, the insulating member 500 is formed to a position higher than an end 460 of the enamel 420.

Figure 3:
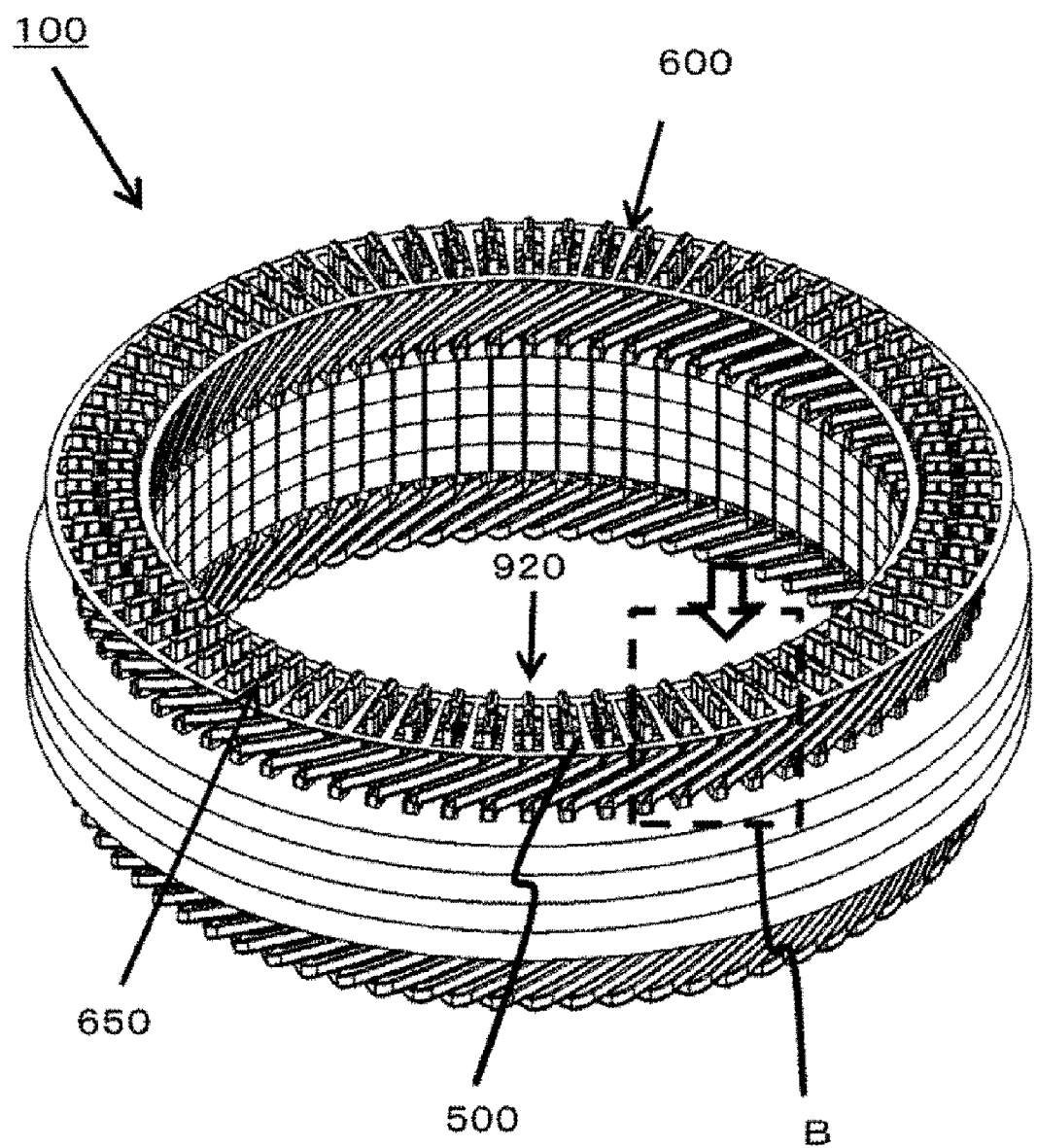
FIG. 3 is a perspective view of an interposed member 600 disposed at coil end portions 400 of the stator 100.

FIG. 3 is a perspective view of an interposed member 600 disposed at the coil end portions 400 of the stator 100.

Each coil end portion 400 is welded in a state of the coil end portion 400 protruding from each through hole 650 provided through the interposed member 600. The interposed member 600 is disposed to cover part of the insulating member 500 before welding.

Figure 4:
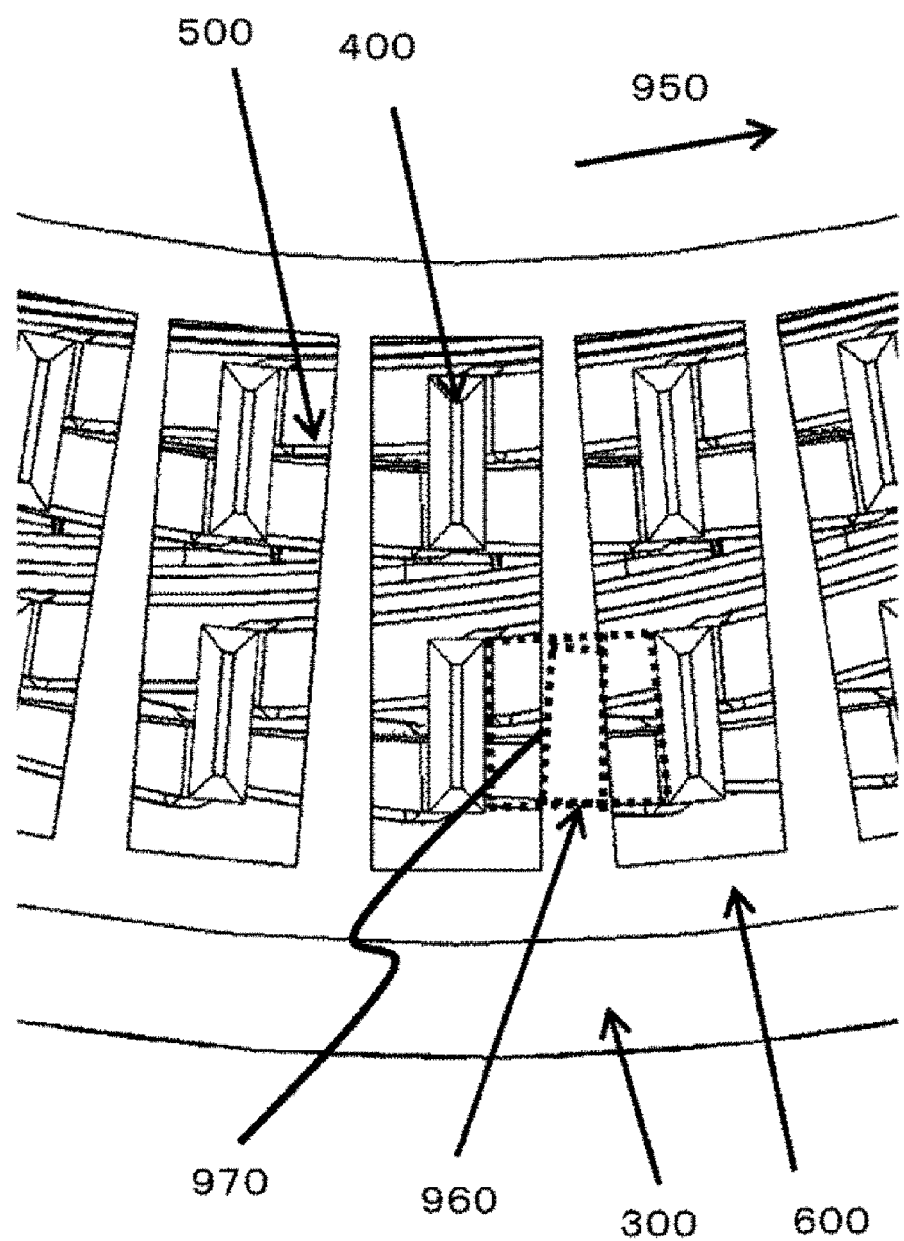
FIG. 4 is an enlarged view around the interposed member 600 as viewed from an arrow direction of a dotted rectangular portion B of FIG. 3.

FIG. 4 is an enlarged view around the interposed member 600 as viewed from an arrow direction of a dotted rectangular portion B of FIG. 3.

The interposed member 600 is disposed to cover part of the insulating member 500 between the coil end portions 400. Furthermore, the interposed member 600 is disposed at a substantially central portion 970 in space 960 between every adjacent coil end portions 400 in the circumferential direction 950 of the stator core 300.

The interposed member 600 contains fiber as a main component that increases the thermal conductively. As a result, radiant heat due to welding and heat transfer transmitted through the stator coils 410 can be more absorbed, thereby enhancing a suppression effect on reduction of reliability due to dielectric breakdown.

In addition, the interposed member 600 contains a film as a main component that increases the durability against breakage. As a result, there can be suppressed a possibility of breakage during disposing operation of the interposed member 600.

Figure 5:
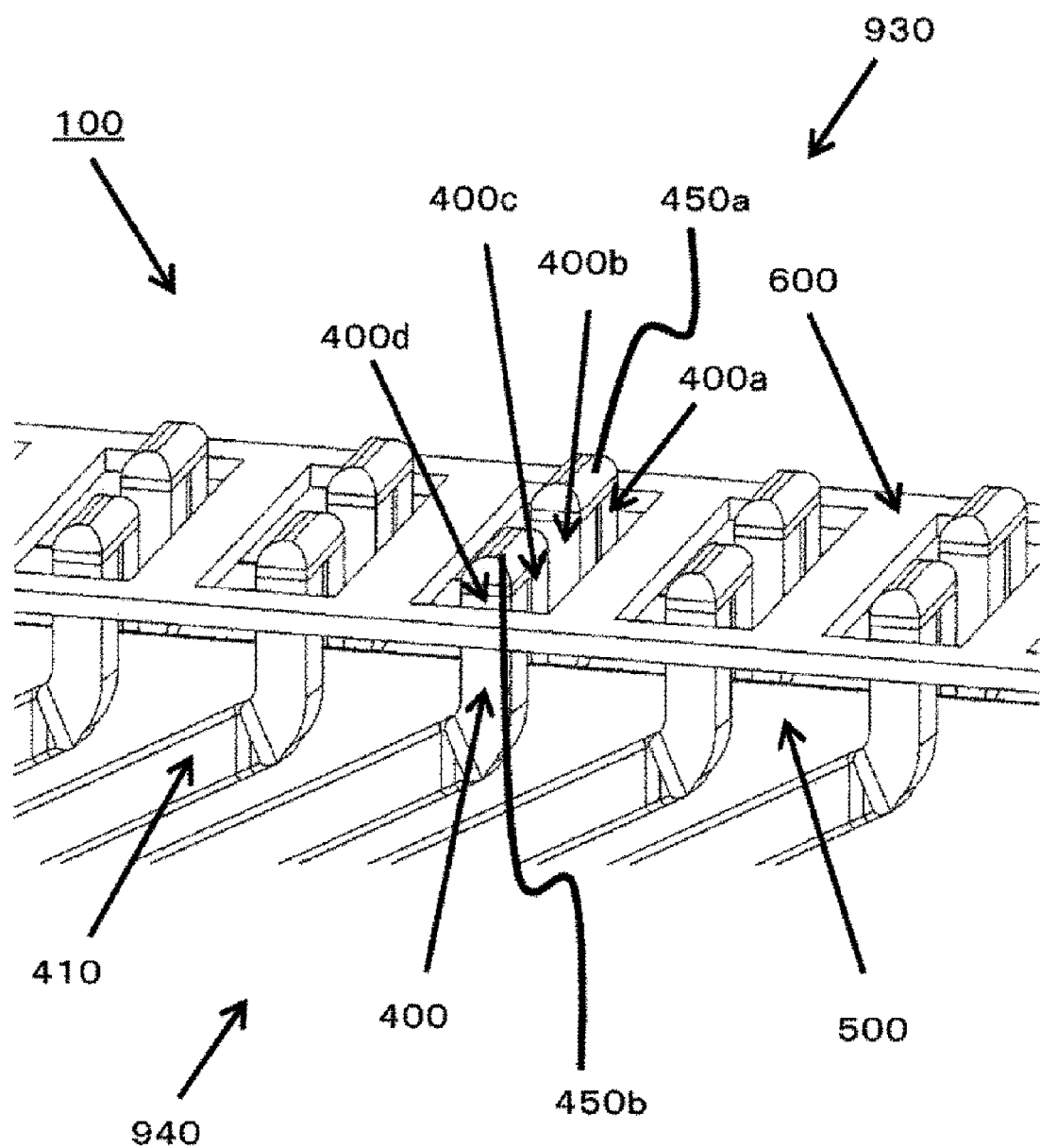
FIG. 5 is an enlarged perspective view of the dotted rectangular portion A around the coil end portions 400 illustrated in FIG. 1.

FIG. 5 is an enlarged perspective view of the dotted rectangular portion A around the coil end portions 400 illustrated in FIG. 1.

Each coil end portion 400 includes a plurality of coil end portions 400a to 400d. The coil end portion 400a, the coil end portion 400b, the coil end portion 400c, and the coil end portion 400d are disposed in this order from space on the inner-diameter side 930 along space on the outer-diameter side 940 of the stator 100.

The coil end portion 400a is coupled to the coil end portion 400b via a welded portion 450a. The coil end portion 400c is coupled to the coil end portion 400d via a welded portion 450b.

Figure 6:
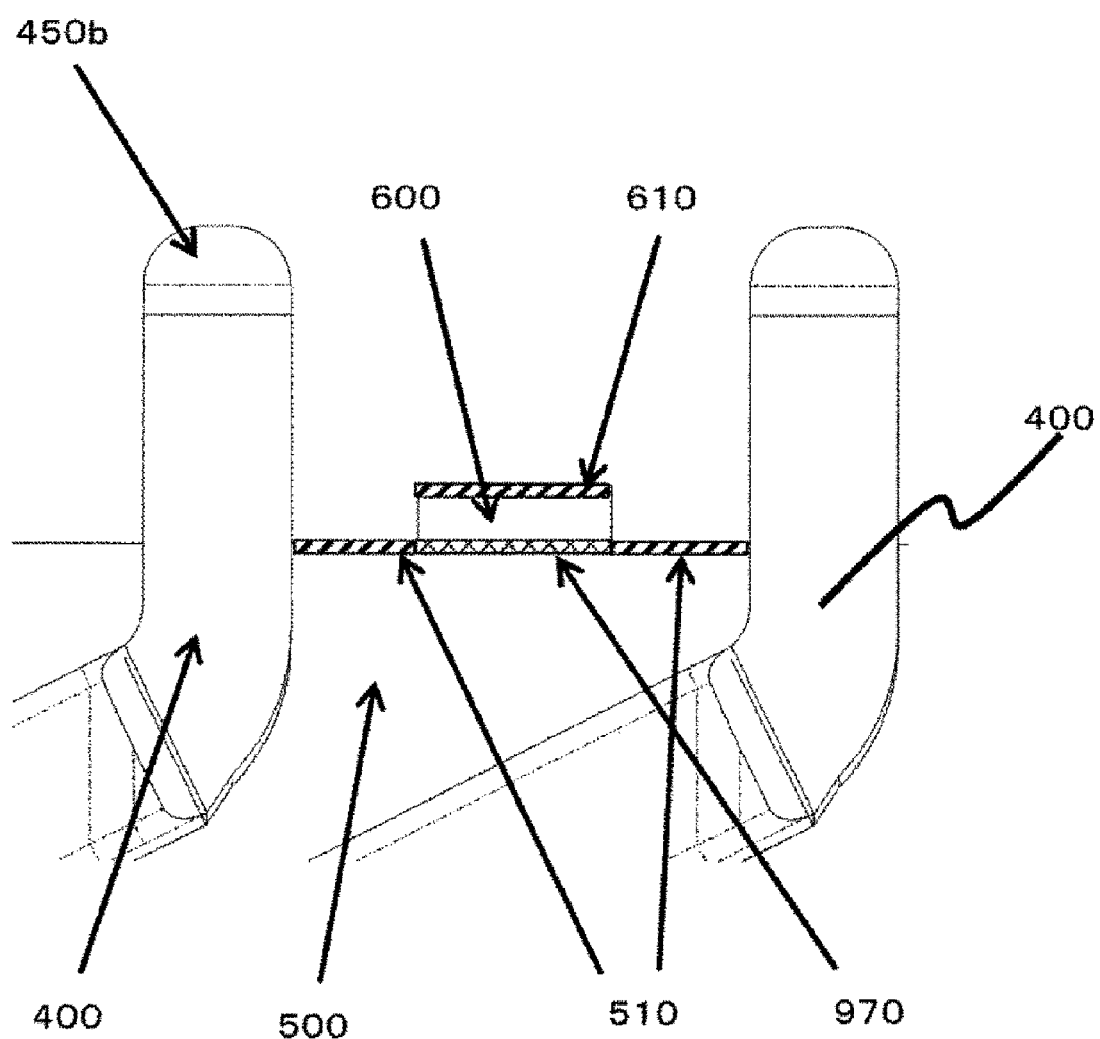
FIG. 6 is an enlarged view of the coil end portions 400 after welding is applied to the stator 100 illustrated in FIG. 5.

FIG. 6 is an enlarged view of the coil end portions 400 after welding is applied to the stator 100 illustrated in FIG. 5.

A burnt portion 510 at the insulating member 500 is caused by radiant heat due to welding when, for example, the welded portion 450b is formed.

Note that the burnt portion 510 of the insulating member 500 can be visually checked after welding, so that completion of the welding can be determined. As a result, the burnt portion 510 of the insulating member 500 can be utilized for improving the yield.

The presence of the interposed member 600 at the substantially central portion 970 between the coil end portions 400 can suppress burning of the insulating member 500 due to radiant heat. A burnt portion 610 of the interposed member 600 is caused by radiant heat due to welding.

The disposition of the interposed member 600 between the coil end portions 400, particular at the substantially central portion 970 can prevent dielectric breakdown due to continuity between adjacent coil end portions 400 via the burnt portion 510.

The interposed member 600 needs to be disposed at the substantially central portion 970 between the coil end portions 400, which has extremely less influence from radiant heat than near the coil end portions 400. As a result, the influence due to heat on the interposed member 600 is extremely reduced, whereby the durability increases to enable multiple usage.

Figure 9:
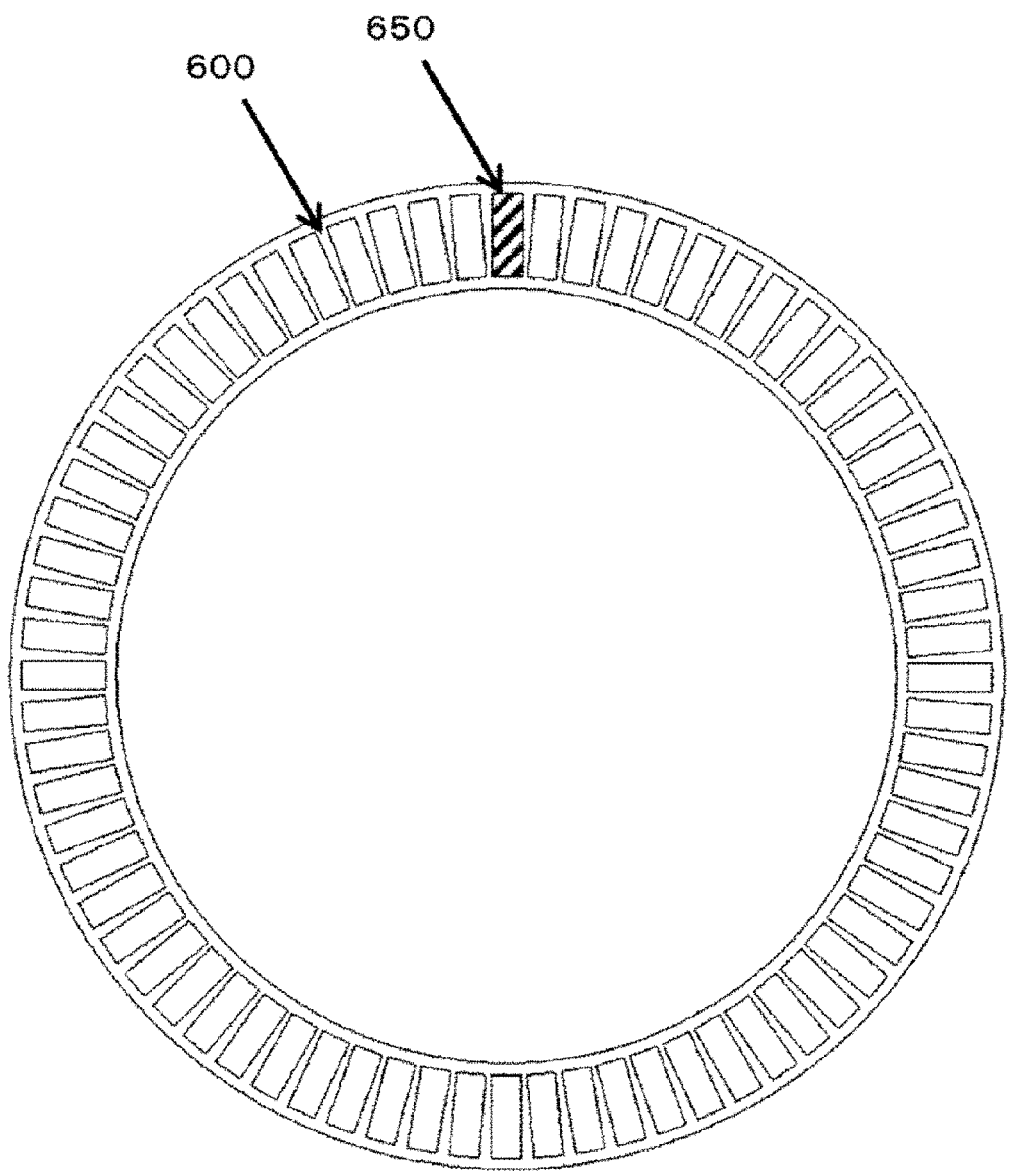
FIG. 9 is a top view of the interposed member 600.

FIG. 9 is a top view of the interposed member 600.

The interposed member 600 is formed annularly along the disposed direction of the coil end portions 400. The interposed member 600 has the plurality of through holes 650 formed for inserting any of the plurality of coil end portions 400 into the plurality of through holes 650. The through holes 650 each have space wider than the cross section of each of the plurality of coil end portions 400 to be able to easily house each of the plurality of coil end portions 400.

Second Embodiment

Figure 7:
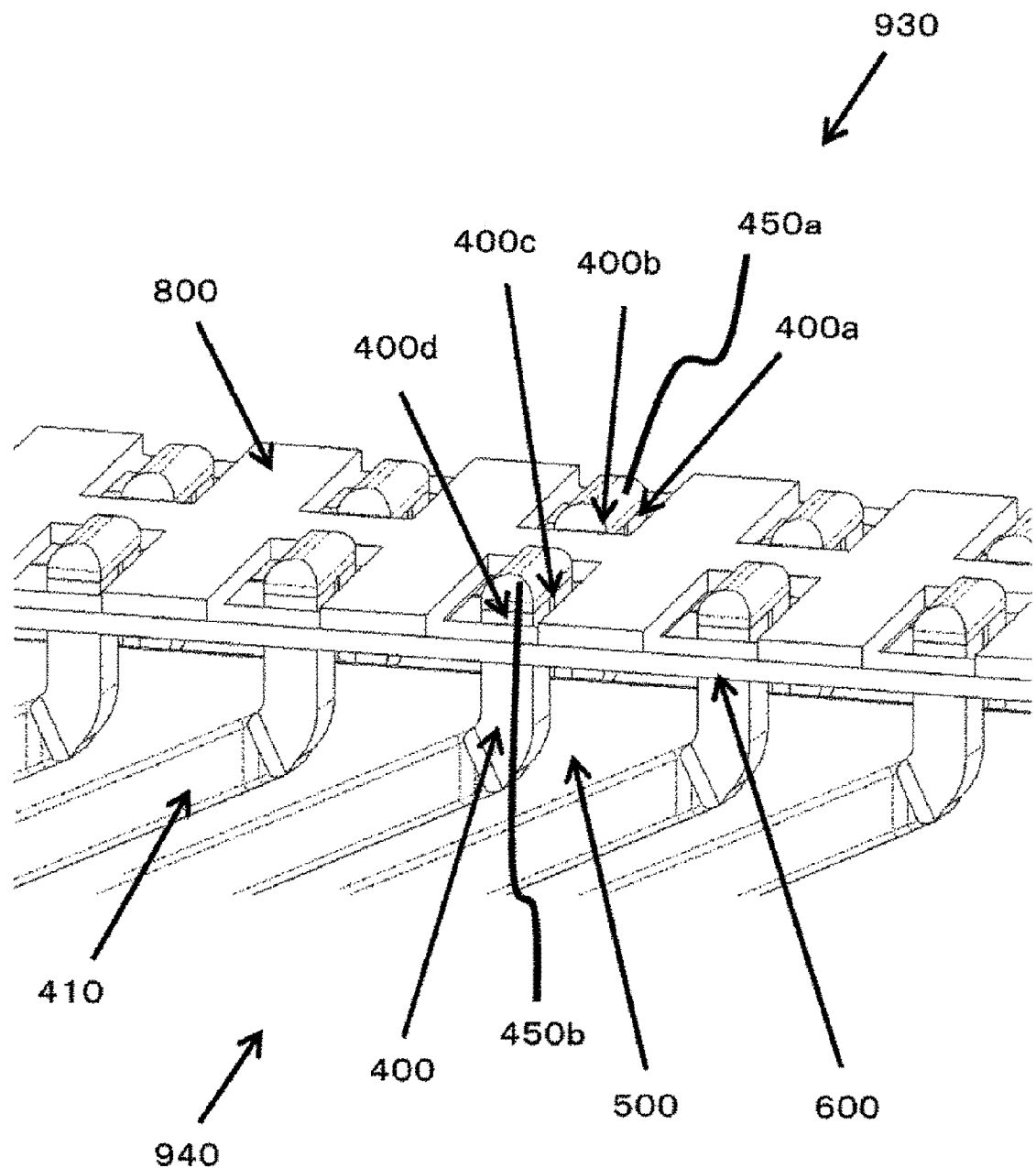
FIG. 7 is an enlarged view of a jig 800 disposed at a stator 110 as illustrated in FIG. 5.

FIG. 7 is an enlarged view of a jig 800 disposed at a stator 110 as illustrated in FIG. 5.

The jig 800 is installed on the upper face of an interposed member 600. A coil end portion 400b is brought close to the inner-diameter side 930 of the stator and positioned close to a coil end portion 400a by the jig 800.

A coil end portion 400c is brought close to the outer-diameter side 940 of the stator and positioned close to a coil end portion 400d by the jig 800.

The coil end portion 400a and the coil end portion 400b are coupled via a welded portion 450a, and the coil end portion 400c and the coil end portion 400d are coupled via a welded portion 450b.

Figure 8:
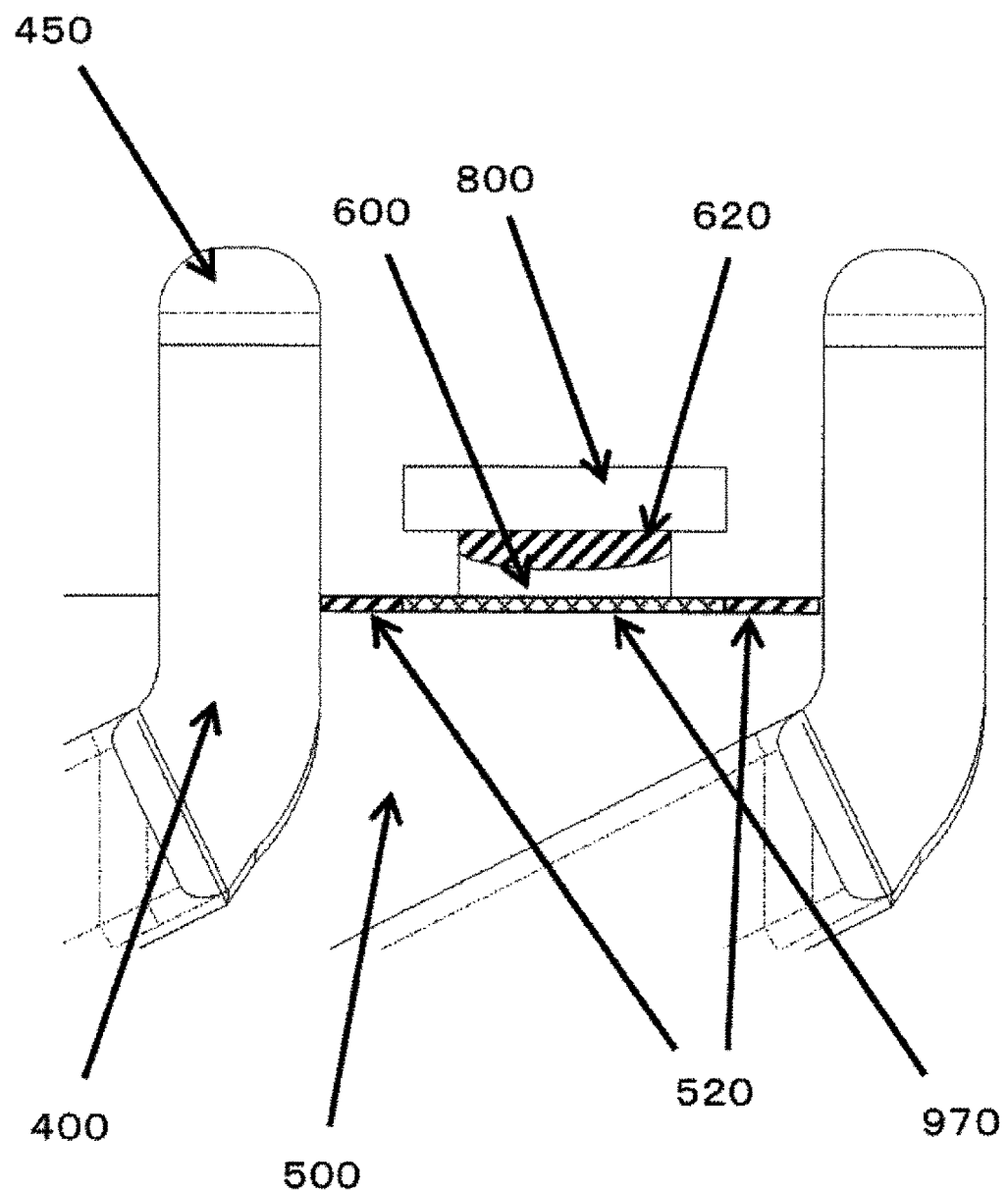
FIG. 8 is an enlarged view after welding is applied to a stator 120 as illustrated in FIG. 7.

FIG. 8 is an enlarged view after welding is applied to a stator 120 as illustrated in FIG. 7.

A burnt portion 520 of an insulating member 500 is caused by radiant heat due to welding. A burnt portion 620 of the interposed member 600 is caused due to heat transfer from the jig 800 generated by welding.

The interposed member 600 is disposed at a substantially central portion 970 between coil end portions 400, in order to prevent dielectric breakdown due to continuity via the burnt portion 520.

The interposed member 600 is disposed at the substantially central portion 970 between the coil end portions 400, which has extremely less influence from radiant heat than near the coil end portions 400.

The use of the jig 800 extremely reduces the influence due to heat on the interposed member 600, so that the durability increases to enable multiple usage.

REFERENCE SIGNS LIST 100 stator
300 stator core
301 upper face portion
400 coil end portion
400a coil end portion
400b coil end portion
400c coil end portion
400d coil end portion
401 obliquely formed portion
410 stator coil
420 enamel
450 welded portion 450a welded portion
450b welded portion
460 end
500 insulating member
510 burnt portion
520 burnt portion
600 interposed member
620 burnt portion
650 through hole
930 inner-diameter side
940 outer-diameter side
950 circumferential direction
960 space
970 substantially central portion

The invention claimed is:

1. A method of manufacturing a stator including an insulating member intervening between a plurality of coil end portions each protruding from a stator core,
the method comprising:
disposing an interposed member to cover a part of the insulating member between the plurality of coil end portions, such that the interposed member is separated from each of the plurality of coil end portions and
welding part of each of the plurality of coil end portions, thus forming a burnt portion of the insulating member and a burnt portion of the interposed member that covers the part of the insulating member;
wherein the burnt portion of the interposed member suppresses burning of the covered part of the insulating member.

2. The method of manufacturing the stator according to claim 1,
wherein the interposed member includes a material containing fiber.

3. The method of manufacturing the stator according to claim 1,
wherein the interposed member includes a film material.

4. The method of manufacturing the stator according to claim 1,
wherein the interposed member is disposed between the insulating member and a jig that positions the plurality of coil end portions.

5. The method of manufacturing the stator according to claim 1,
wherein the interposed member is formed annularly along a disposed direction of the plurality of coil end portions, the interposed member having a plurality of through holes formed for inserting the plurality of coil end portions into the plurality of through holes.

6. The method of manufacturing the stator according to claim 1,
wherein the interposed member is disposed in a space between every adjacent coil end portions in a circumferential direction of the stator core, and
wherein the interposed member is disposed equidistant between a first coil end portion and a second coil end portion.

* * * * *